United States Patent Office 3,371,981
Patented Mar. 5, 1968

3,371,981
CYCLOHEXENOTHIAZOLE AZO DYES DYEING OF METALLIZED POLYOLEFINS
Shinya Itoh, Kyoto, Yoshitaka Kubota, Ohtsu-shi, and Masao Iizuka, Yokohama, Japan, assignors to Toyo Rayon Kabushiki Kaisha, Tokyo, Japan, a corporation of Japan
No Drawing. Filed Dec. 28, 1964, Ser. No. 421,640
Claims priority, application Japan, Apr. 7, 1964, 39/19,316
4 Claims. (Cl. 8—4)

ABSTRACT OF THE DISCLOSURE

Applicants dye metallized polyolefin fibers and other shapes with a metallizable cyclohexenothiazole azo dye with an OH group in the ortho position to the azo group on the coupler.

---

This invention relates to a process for coloring a polyolefin shaped article containing a metal compound with the use of a specified dyestuff which can give the brightness of shade and fastness characteristics.

Generally speaking, the polymers of olefins such as ethylene and propylene substantially lack in dyestuff binding groups. So they exhibit a very small degree of affinity for dyestuffs or pigments which are usually used for coloring natural or synthetic substances. Though having temporary affinity for a polyolefin shaped article, these dyestuffs tend to bleed out. It has been difficult in practice to obtain the dyeings of a polyolefin shaped article which exhibit excellent fastness to light, washing, dry cleaning, sublimation and rubbing, etc.

It has hitherto been proposed with a purpose of overcoming these difficulties to incorporate as a dyestuff binding agent a certain class of metal compound in a polyolefin resin and to dye the shaped article which is obtained by melt spinning this blend. For instance, the specification of United States Patent No. 2,984,634 proposes a process which comprises incorporating a metal compound, being a 6 to 12 carbon atom carboxylic acid salt of nickel, chromium, cobalt, aluminium, titanium and zirconium, into a crystalline polymerized α-monolefinic hydrocarbon in an amount of 0.1 to 2% by weight calculated as metal, shaping the blend and thereafter colouring the shaped article by means of an anthraquinonic dyestuff. However, the use of this anthraquinonic dyestuff does not give rise to fully satisfactory colorings. Also, Japanese Patent Publication No. 4477/1963 describes a process which comprises coloring an article of poly-α-olefin wherein there is incorporated a basic or anionic exchange substance containing the metal of Group 2a, 2b or 4a of the Periodic Table by using a dyestuff having a slightly ionizable acidic group and thereby forming a salt or chelate of the dyestuff and the metal. However, the process shown in this publication does not impart satisfactory fastness to light, washing, dry-cleaning and rubbing. Some of the named dyestuffs never bring about commercially allowable dyeings. Elsewhere, Belgian Patents Nos. 632,652 and 632,653 propose a method of coloring the Werner-complex-forming metal containing polymer of ethylene or propylene by means of a monoazo dyestuff containing a group capable of forming a metal chelate with its metal. Some of the dyestuffs disclosed specifically in these Belgian patents develop a deep color in a polyolefin shaped article containing a metal compound. However, such problems as the brightness of shade and level dyeing are still unsolved.

It has now been found that when a shaped article of polyolefin obtained by melt-shaping a polyolefin resin wherein there is incorporated at least 0.01% by weight calculated as metal of a transition metal compound is dyed by means of a water-insoluble cyclohexanothiazole monoazo dyestuff of the formula:

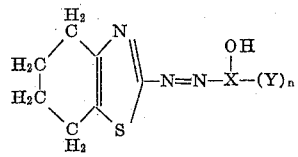

(I)

(wherein X represents an aromatic or heterocyclic radical having one or two rings in which a hydroxyl radical is bonded at the ortho-position to the azo radical; Y represents hydrogen or a non-solubilizing substituent; and $n$ is 1 or 2), there is obtained a brilliant and fast dyeing.

The novel dyestuff of the above Formula I can be obtained in accordance with the known manner. It can be prepared by coupling diazotized 2-aminocyclohexenothiazole with a compound of the formula:

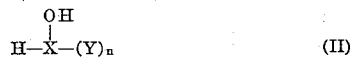

(II)

(wherein X represents an aromatic or heterocyclic radical having one or two rings; Y represents hydrogen or a non-solubilizing substituent; and $n$ is 1 or 2) at the ortho-position to the hydroxyl radical in X.

In the Formula I or II, X may be an aromatic nucleus such as benzene nucleus and naphthalene nucleus or a heterocyclic nucleus such as quinoline nucleus or hydrazone nucleus. These aromatic nuclei or heterocyclic nuclei may be substituted with a water-insoluble substituent such as alkyl, aryl, alkoxy, halogen, amino, alkylamino, arylamino, N-alkyl-N-arylamino, aralkylamino, acylamino, cyano, trifluoromethyl, carbamoyl or alkoxy carbamoyl.

As the polyolefin resins to be used in this invention, there are homopolymers of α-olefins such as ethylene, propylene, 3-methylbutene-1, 4-methyl-pentene and 5-methyl-hexene-1, copolymers of two or more of these α-olefins, and graft-copolymers of these parent polymers grafted with other monomers. In these olefin polymers, other polymers such as polyester amide, polyurea, polyurethane, epoxy resin or polycarbonate may be incorporated. Furthermore, the polyolefin resins may contain a phenol or amine type anti-oxidation agent, an ultra-violet ray absorbent such as benzophenone derivatives or triazine derivatives or fluorescent brightener, a delustering agent such as titanium oxide, a stabilizer such as alkali earth metal salt of fatty acid or organic phosphate or a dyeing auxiliary, or a plasticizer such as dioctylphthalate.

The metal compound to be incorporated in the polyolefinic resin in accordance with this invention is a dissociable compound of a transition metal. Nickel, zinc, copper, chromium and cobalt, especially nickel and zinc, are preferable metal components. As dissociable compounds of these metals, organic acid salts and organic complex compounds are preferable. In particular, higher carboxyl acid salts such as nickel stearate, nickel palmitate, nickel oleate, nickel naphthenate, zinc stearate, zinc oleate, zinc naphthenate, chromium stearate, cobalt stearate and copper naphthenate. Together with these higher carboxylic acids or in place of these, there can be used amino acid salts such as 2-amino acid nickel, salts of alkyl phosphate such as di-n-propyl-nickel-phosphate, n-hexyl-ethyl-nickel-phosphate, sulphonates such as dodecyl benzene-nickel-sulphonate and t-octylbenzene-chromium-sulphonate as well as benzoates, salicylates, salts of alkyl-phosphite, naphthionates, and salt of alkylsulphate. Furthermore, there are organic complex salts such as nickel acetylacetonate and zinc 8-hydroxy quinolinate, and weak chelate compounds such as metal chelate compounds of malonic acid ester derivatives and metal chelate compounds of acetoacetic acid derivatives. In a metal chelate compound, the substitution of chelate takes place between this compound and the dyestuff at the time of coloring so it gives a relatively slow dyeing speed.

The transition metal compounds are incorporated in the polyolefin resin in an amount of at least 0.01% by weight, and preferably 0.1–1% by weight, calculated as metal based on the resin prior to melt-shaping.

Among the metal compounds to be incorporated in the polyolefin resin in this invention, the metal compound of copper, silver or gold show a good coordination bond with the dyestuffs of this invention, but a defect is that when the melt temperature is high in the polyolefin resin, they are easily changed into brown color. When the metal compound of zinc, cadmium, mercury, titanium, zirconium or hafnium is used, discoloration hardly takes place during the melt-shaping of the polyolefin resin though the decomposition of the metal compound is more or less observable. However, it shows a slightly lower tendency to a coordination bond with the dyestuff of this invention. The metal compound of chromium, molybdenum, or tungsten is not discolored by heat and is stable in the molten polymer. It shows a slight inferiority in the dyeing effect to be brought about by a coordination bond with the dyestuff of this invention, but exhibits excellent fastness properties. The metal compound of iron, cobalt or nickel gives good thermal stability in the molten polymer, a coordination bond with the dyestuff of this invention and fastness of color; it gives rise to the most excellent effects. The use of a cobalt compound, however, involves some deterioration in the weatherability of the polymer. In consideration of the color shade, brightness and fastness of the dyeings obtained by the dyestuffs of this invention, zinc, copper, chromium, and particularly nickel, are preferable as a metal component.

The polyolefin resin in which a transition metal compound is incorporated can be melt-shaped, quenched and stretched in accordance with the known manner.

In the practice of the process covered by this invention, the said water-insoluble mono-azo dyestuff of the formula (I) is dispersed in the water or solubilized with the acid of a dispersant or a solubilizing agent. As a dispersant or solubilizing agent, there are used optional anionic and non-ionic surface active agent. However, when this dyestuff is used on dissolution in a polyoxyethylene non-ionic surfactant wherein polyoxyethylene accounts for 60–85% instead of an ordinary anionic levelling agent or a very hydrophilic non-ionic levelling agent, this dyestuff permeates into the polyolefin shaped article homogeneously and excellently. It is especially preferable, therefore, to prepare the dyeing liquid by using this kind of dyestuff treating agent. A particularly good dyeing liquid is obtained by fusing the dyestuff with this kind of dyestuff treating agent, followed by dilution.

In this invention, optional dyeing methods such as a carrier dyeing method, a solubilization dyeing method, a high pressure high temperature dyeing method, and a thermosol dyeing method can be employed in carrying out the dyeing by using the said dyestuff (I). The amount of the dyestuff to be used in this invention can be varied over a wide range, but about 0.1–6% against the material to be dyed is suitable. The dyeing temperature should preferably be 70°–120° C., and when the dyeing is carried out at a temperature raised beyond this, there is a tendency that the amount of adsorption is decreased. In the dyeing process of this invention, the adjustment of the pH of the dyeing liquid to 3–8 gives rise to excellent dyeing effects, but when dyeing is carried out by using a dyeing liquid having the pH of more than 9 or stronger acidity, the color value is somewhat decreased.

The dyeings are treated with a wash liquid in which is incorporated soap or an equally effective surfactant, washed and dried; or reduction washing may be effected by using hydrosulphite, caustic soda and suitable surfactant. In accordance with this invention, remarkably brilliant dyeings of a polyolefin shaped article containing a metal compound can be obtained free from a peculiar indistinctness caused by the ordinary metal complex dyestuff. It is also possible to obtain dyeings having excellent fastness to light, washing, dry cleaning, rubbing, and sublimation.

The following examples explain this invention. Unless otherwise specified, the part means a part by weight. The intrinsic viscosity of the polymer is the value determined in tetralin of 135° C. The evaluation of the fastness of dyeings was conducted in accordance with the AATCC method.

Fastness to light (AATCC 16A, 1963)
Fastness to washing (AATCC 36, 1961, III)
Fastness to rubbing (AATCC 8, 1961)
Fastness to dry cleaning (AATCC 85, 1963)

EXAMPLE 1

Some 0.2 g. of a dyestuff of the formula:

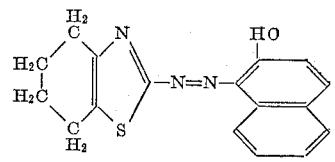

were milled well with 0.2 g. of sodium dinaphthylmethanedisulfonate and 0.05 g. of sodium dodecylbenzenesulfonate and dispersed in 300 cc. of water. In this bath were dipped 10 g. of polypropylene fiber obtained by melt-spinning at 250° C. and stretching 5 X a chip which was prepared from 97 parts of isotactic polypropylene having an intrinsic viscosity of 1.53 and 3 parts of nickel stearate. The bath was heated to about 98° C. in about 20 minutes. Dyeing was continued for about 60 minutes at this temperature. The dyed fiber was removed, washed with water and treated with a soap solution. After rinsing with warm water, the dyed fiber was dried. It was colored bright blue and had excellent fastness to dry-cleaning, light, washing and rubbing as shown below:

| | Grade (AATCC) |
|---|---|
| Fastness to dry-cleaning | 5 |
| Fastness to light | 6 |
| Fastness to washing | 4 |
| Fastness to rubbing | 4 |

EXAMPLE 2

Some 0.3 g. of a dyestuff of the formula:

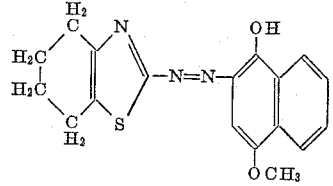

were milled with 0.2 g. of polyoxyethylene nonylphenol ether $(EO)_{10}$, and dispersed in 250 cc. of water. The pH of the dye bath was adjusted to 3.5 with an acetic acid. In this bath were dipped 10 g. of a fiber obtained by melt-spinning at 260° C. and stretching 5 X a chip prepared from 97 parts of isotactic polypropylene having an intrinsic viscosity of 1.60 and 3 parts of nickel palmitate. The treatment was carried out in the same manner as described in Example 1. The dyeing was colored very brilliant blue and had excellent fastness to dry-cleaning, light, washing and rubbing as shown below.

| | Grade (AATCC) |
|---|---|
| Fastness to dry-cleaning | 5 |
| Fastness to light | 7 |
| Fastness to washing | 5 |
| Fastness to rubbing | 5 |

EXAMPLE 3

Substantially the same procedures as in Example 1 were repeated except that a dyestuff of the formula:

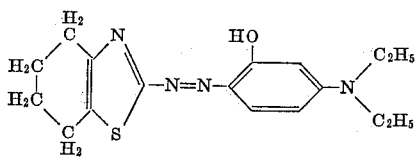

was used. There was obtained a strong violet dyeing of excellent fastness as shown below.

Grade (AATCC)
Fastness to dry-cleaning _____ 4
Fastness to light _____ 6
Fastness to washing _____ 4
Fastness to rubbing _____ 4

EXAMPLE 4

Some 0.02 g. of a dyestuff of the formula:

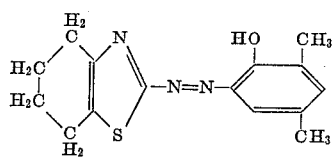

were milled with 0.2 g. of sodium dinaphthylmethanedisulfonate and 0.05 g. of sodium dodecylbenzenesulfonate, and dispersed in 500 cc. of water. In this dye bath were dipped 10 g. of a fiber obtained by melt-spinning at 250° C. and stretching 5 X a chip prepared from 97 parts of powder isotactic polypropylene having an intrinsic viscosity of 1.53 and 3 parts of nickel naphthenate. The dye bath was heated to about 98° C. in about 40 minutes. The treatment was continued as shown in Example 1. The obtained dyeing was colored a brilliant green and had excellent fastness as shown below.

Grade (AATCC)
Fastness to dry-cleaning _____ 4
Fastness to light _____ 6
Fastness to washing _____ 5
Fastness to rubbing _____ 4

EXAMPLE 5

Some 0.1 g. of a dyestuff of the formula:

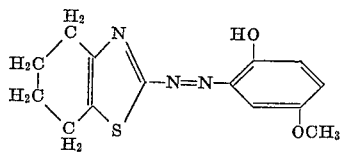

were milled with 0.2 g. of polyoxyethylene nonylphenol ether $(EO)_{18}$, and dispersed in 400 cc. of water. The pH of the bath was adjusted to 3.5 with an acetic acid. In this dye bath, polypropylene fiber used in Example 1 was dipped, and the procedures described in Example 2 were repeated. The deep green shade of the following fastness was obtained.

Grade (AATCC)
Fastness to dry-cleaning _____ 5
Fastness to light _____ 6
Fastness to washing _____ 5
Fastness to rubbing _____ 4

EXAMPLE 6

Substantially the same procedures as described in Example 2 were repeated except that a dyestuff of the formula:

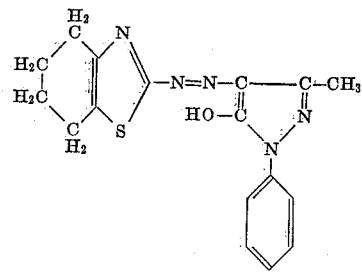

and the fiber of Example 1 were used. A brilliant orange dyeing of the following fastness properties was obtained.

Grade (AATCC)
Fastness to dry-cleaning _____ 5
Fastness to light _____ 7
Fastness to washing _____ 5
Fastness to rubbing _____ 5

EXAMPLE 7

Substantially the same procedures as described in Example 1 were repeated except that a dyestuff of the formula:

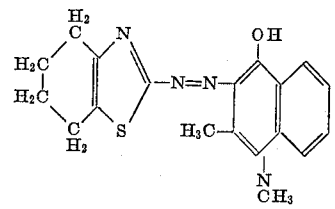

and the fiber of Example 2 were used. A brilliant scarlet dyeing of the following fastness was obtained.

Grade (AATCC)
Fastness to dry-cleaning _____ 4
Fastness to light _____ 5
Fastness to washing _____ 4
Fastness to rubbing _____ 5

EXAMPLE 8

In accordance with the procedures described in Example 1, the fiber used in Example 1 was dyed by means of dyestuffs obtained by coupling each of the coupling components indicated in Table I below with diazotized 2-aminocyclohexenothiazole or thiazole. The grades of fastness to light of the obtained dyeings are shown in Table I.

TABLE I

| Coupling Component | Grade of light fastness (AATCC) | |
|---|---|---|
| | Cyclohexeno-thiazole | Thiazole |
| β-naphthol | 6 | 2 |
| 6-bromo-β-naphthol | 5 | 1 |
| 5,6,7,8-tetrahydro-β-naphthol | 6 | 2 |
| 4-methoxy-α-naphthol | 7 | 1 |
| 4-ethoxy-α-naphthol | 7 | 1 |
| 4-methoxy-5-chloro-α-naphthol | 5 | 1 |
| 4-methoxy-5,8-dichloro-α-naphthol | 5 | 1 |
| m-Aminophenol | 5 | 2 |
| m-Dimethylaminophenol | 6 | 3 |
| m-Diethylaminophenol | 6 | 3 |
| m-Phenylaminophenol | 6 | 3 |
| m-Acetylaminophenol | 5 | 2 |
| P-Cresol | 6 | 2 |
| 2,4-xylenol | 6 | 2 |
| 3,4-xylenol | 6 | 2 |
| 2-chloro-4-methylphenol | 5 | 1 |
| Resorcin | 5 | 1 |
| Resorcinmonomethyl ether | 5 | 2 |
| Hydroquinonemonomethyl ether | 6 | 3 |
| 1-phenyl-3-methylpyrazolone (5) | 7 | 4 |
| 1-(4'-chlorophenyl)-3-methylpyrazolone (5) | 7 | 4 |
| 1-(3'-methylphenyl)-3-methylpyrazolone (5) | 7 | 4 |
| 1-(2',4'-dimethoxyphenyl)-3-methylpyrazolone (5) | 6 | 4 |
| 1-phenyl-3-n-propylpyrazolone (5) | 6 | 3 |
| 2,4-dioxyquinoline | 5 | 2 |
| N-methyl-4-hydroxy-2-methylquinoline | 5 | 2 |

What we claim is:

1. In a process for coloring a shaped article of polyolefin containing a transition metal compound, the process characterised by coloring a shaped article of polymer of olefin obtained by melt-shaping a polyolefinic resin wherein there is incorporated at least 0.01% by weight, calculated as metal, of a transition metal compound by means of a water-insoluble cyclohexenothiazole monoazo dyestuff of the formula:

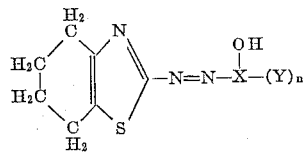

in which X represents an aromatic or heterocyclic radical having one or two rings wherein a hydroxyl radical is bonded at the ortho-position to the azo radical; Y represents hydrogen or a non-solubilizing substituent; and $n$ is 1 or 2.

2. A process as described in claim 1 wherein the transition metal compound is an organic acid salt of a transition metal.

3. A process as described in claim 2 wherein the transition metal compound is a carboxylic acid salt of a transition metal.

4. A process as described in claim 1 wherein the transition metal is nickel.

References Cited

UNITED STATES PATENTS 2,865,909  12/1958  Straley et al. _____ 8—55 XR
2,984,634  5/1961  Caldwell et al. _____ 8—55

NORMAN G. TORCHIN, *Primary Examiner.*

DONALD LEVY, *Assistant Examiner.*